United States Patent
Chen et al.

(10) Patent No.: US 7,081,180 B2
(45) Date of Patent: Jul. 25, 2006

(54) ROLL-TO-ROLL PROCESS FOR FABRICATING PASSIVE MATRIX PLASTIC DISPLAYS

(75) Inventors: Jyh-Luen Chen, Taipei (TW); Wen-Tung Wang, Hsinchu (TW); Shuo-Wei Liang, Banciao (TW); Chia-Hsiang Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 167 days.

(21) Appl. No.: 10/729,944

(22) Filed: Dec. 9, 2003

(65) Prior Publication Data

US 2005/0067094 A1    Mar. 31, 2005

(30) Foreign Application Priority Data

Sep. 29, 2003   (TW) ............................... 92126799 A

(51) Int. Cl.
*B32B 37/20*    (2006.01)
*B32B 15/04*    (2006.01)

(52) U.S. Cl. ............... 156/269; 156/263; 156/270; 156/324; 156/514; 427/66; 438/30

(58) Field of Classification Search ............... 156/250, 156/263, 270, 324, 291, 513, 514, 269; 438/30; 427/66
See application file for complete search history.

(56) References Cited

U.S. PATENT DOCUMENTS

| | | | | |
|---|---|---|---|---|
| 4,818,312 A * | 4/1989 | Benge | .......................... | 156/52 |
| 6,118,502 A * | 9/2000 | Yamazaki et al. | ............ | 349/45 |
| 6,214,444 B1 * | 4/2001 | Uchibori | ..................... | 428/209 |
| 6,309,902 B1 * | 10/2001 | Muramatsu | .................. | 438/30 |
| 6,496,767 B1 * | 12/2002 | Lorentz | ....................... | 701/55 |
| 6,518,944 B1 * | 2/2003 | Doane et al. | ................. | 345/87 |
| 6,769,782 B1 * | 8/2004 | Lee | ............................ | 362/600 |
| 6,829,030 B1 * | 12/2004 | Hagiwara | ................... | 349/149 |
| 2002/0017682 A1 * | 2/2002 | Xu et al. | ..................... | 257/328 |

* cited by examiner

*Primary Examiner*—Mark A. Osele
(74) *Attorney, Agent, or Firm*—Bacon & Thomas, PLLC

(57) ABSTRACT

A process for fabricating passive plastic displays, comprising the steps of: adopting a roll-to-roll coating machine for fabricating a bottom substrate having a fist patterned conducting line, fabricating a top substrate having a second patterned conducting line and an active area of polymeric liquid crystal on the surface of the top substrate by means of a roll-to-roll coating machine, and sealing the top and the bottom substrates by means of a roll-to-roll coating machine to form a plurality of display panels. Due to the continuous fabrication of the present invention with the low-cost apparatuses, applications of the plastic displays in the low-end products can be accelerated.

16 Claims, 3 Drawing Sheets

ROLL-TO-ROLL PROCESS FOR FABRICATING PASSIVE MATRIX PLASTIC DISPLAYS

BACKGROUND OF THE INVENTION

1. Field of the Invention

The present invention relates to a roll-to-roll process for fabricating flexible plastic displays, and more particularly, to a roll-to-roll process for fabricating passive matrix plastic displays.

2. Description of Related Art

The flexible plastic displays have unique advantages of high impact resistance, lightweight and flexibility. In addition to potentialities of applications in the newly emerging markets for paper, electronic tag, credit card, scrolling display and electronic advertisement board, an opportunity for being associated with the portable products exist. This marketplace is currently noticeable.

Passive displays fabricated by the conventional process need to go through steps of film deposition, photolithography, and etching. Also, the apparatuses for manufacturing passive displays are expensive, and the costs of research and development in this field of technology as well as fabrication are high. Furthermore, the known process is not a continuous process, which is hard to provide obvious increase in the yield. As a result, the price and the cost cannot be reduced on a large scale for wide-spreading the application of the plastic displays.

To accelerate the wide application of the plastic displays in the low-end products, a roll-to-roll process for continuously fabricating passive plastic displays at lower fabrication cost, arising from flexibility of the plastics, is conceived. It is therefore desirable to provide a roll-to-roll process for fabricating passive plastic displays to mitigate and/or obviate the aforementioned problems.

SUMMARY OF THE INVENTION

The primary object of the present invention is to provide a process for fabricating passive matrix plastic displays so as to use flexibility of the plastics for forming top and bottom substrate electrodes respectively by coating in a continuous roll-to-roll manner and to coat a polymeric liquid crystal without spending time in the liquid crystal filling. Hence, the process is simplified, the fabrication cost is reduced, and the application of the plastic displays in the low-end products is accelerated.

To attain the aforesaid object, a process for fabricating passive matrix plastic displays comprises the following steps: forming a plurality of second conducting lines over a second plastic substrate with a roll-to-roll coating machine, wherein the second conducting lines are disposed perpendicular to the transportation direction of the second plastic substrate; continuously coating a polymeric liquid crystal over the second plastic substrate to form a plurality of block-shaped active areas; hollowing or drilling the portions of the plastic substrate outside the block-shaped active areas mounted on the second plastic substrate with a cutting machine; providing a first plastic substrate having a plurality of first conducting lines disposed parallel to-one another to have the first and the second plastic substrates mounted on a roll-to-roll coating machine simultaneously, wherein the first conducting lines of the first plastic substrate are disposed parallel to the transportation direction of the first plastic substrate; and sealing the first and the second plastic substrates with an adhesive to form a plurality of passive matrix plastic display panels.

A process for fabricating passive matrix plastic displays according to the present invention comprises fabrication of a second plastic substrate and seal of a first plastic substrate and the second plastic substrate. The process for fabricating the first plastic substrate is not specifically defined, and can be achieved by a roll-to-roll coating machine. When a first conducting line is a transparent electrode, a second conducting line is formed of a metallic adhesive (or adhesives containing metal particles). On the contrary, when the first conducting line is made of a metallic adhesive (or adhesives containing metal particles), the second conducting line is a transparent electrode. Alternatively, both the first and the second conducting lines can be transparent electrodes. Preferably, the transparent electrode is made of a conductive polymer to improve stability of coating. Generally, the metallic adhesive is consisted of a metallic powder and a resin. Preferably, the metallic powder is a silver powder, an aluminum powder or a copper powder. In fabricating the first plastic substrate (which normally is the bottom substrate of the display), a plurality of first conducting lines disposed parallel to one another are continuously formed over the first plastic substrate with a roll-to-roll coating machine. The first conducting lines are preferably formed by means of a dispenser or a die for screen-printing, stamping or coating, being disposed parallel to the transportation direction of the first plastic substrate. Preferably, there is an ultraviolet-radiation or a heat-drying machine for curing or hardening the first conducting lines after the first conducting lines are formed to save the space occupied by the roll-to-roll coating machine. Then, the first plastic substrate is rolled up to become a coil.

In fabricating the second plastic substrate (which normally is the top substrate of the display), a plurality of second conducting lines disposed parallel to one another are sequentially formed over the second plastic substrate with a roll-to-roll coating machine. The second conducting lines disposed perpendicular to the transportation direction of the second plastic substrate are preferably formed by means of a dispenser or a die for screen printing, stamping or coating. Preferably, there is an ultraviolet-radiation or a heat-drying machine for curing or hardening the second conducting lines after the second conducting lines are formed to save the space occupied by the roll-to-roll coating machine. Then, a polymeric liquid crystal is coated continuously over the second plastic substrate to form a plurality of block-shaped active areas, and preferably, it is made by the slot-die coating technology. Finally, the portions of the plastic substrate outside the block-shaped active areas become hollow with a cutting machine. Preferably, each of the hollow portions is of rectangular shape, having a width (the length of the portion perpendicular to the transportation direction of the second plastic substrate) which is shorter than the width of the second plastic substrate to prevent the second plastic substrate from cracking during transportation and is longer than the width of every block-shaped active area perpendicular to the transportation direction of the second plastic substrate to expose every stripe-shaped electrode of the first conducting lines after the top and the bottom substrates are sealed for being adapted to a driving circuit to be assembled. Then, the plastic substrate is rolled up to become a coil, and the fabrication of the second plastic substrate is completed.

In sealing the first and the second plastic substrates, the first and the second plastic substrates are transported with a roll-to-roll coating machine, and are bound together with an adhesive. The adhesive is coated over either the first plastic substrate or the second plastic substrate. Preferably, the adhesive is coated over the second plastic substrate, having an adhesion area larger in dimension than the block-shaped active area so that the adhesive does not cover the first conducting lines after the seal. The adhesive is coated preferably by the slot-die coating technology. It is preferable to add an ultraviolet- or a hot- drying machine for hardening the adhesive after the seal to save the space occupied by the roll-to-roll coating machine. A cutting machine is preferably added after drying the adhesive to cut the plurality of active areas into a plurality of passive matrix plastic display panels.

The present invention adopts top and bottom substrates of different widths and the hollowing or drilling technique to expose the conducting lines for being adapted to a driving circuit to be assembled. The width of the first plastic substrate is shorter than the width of the second plastic substrate. When the top and the bottom substrates are sealed, the first plastic substrate is aligned with the second plastic substrate on one side thereof. As such, the second conducting lines are exposed outside the first plastic substrate, being perpendicular to the first conducting lines. To apply a uniform tension to the plastic substrate to be stably movable in the horizontal direction, the roll-to-roll coating machine generally is positioned in front of the plastic substrate being rolled up and behind the plastic substrate being unwound and straightened.

The fabrication of the plastic displays according to the present invention has been changed from non-continuous and high-cost to continuous and low-cost. To develop a process more suitable for the coating treatment, the present invention replaces ITO and the conventional liquid crystals with a conductive polymer and a polymeric liquid crystal.

According to the present invention, the process for sealing the first plastic substrate and the second plastic substrate can be made by means of either one roll-to-roll coating machine in a continuous manner or different roll-to-roll coating machines.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
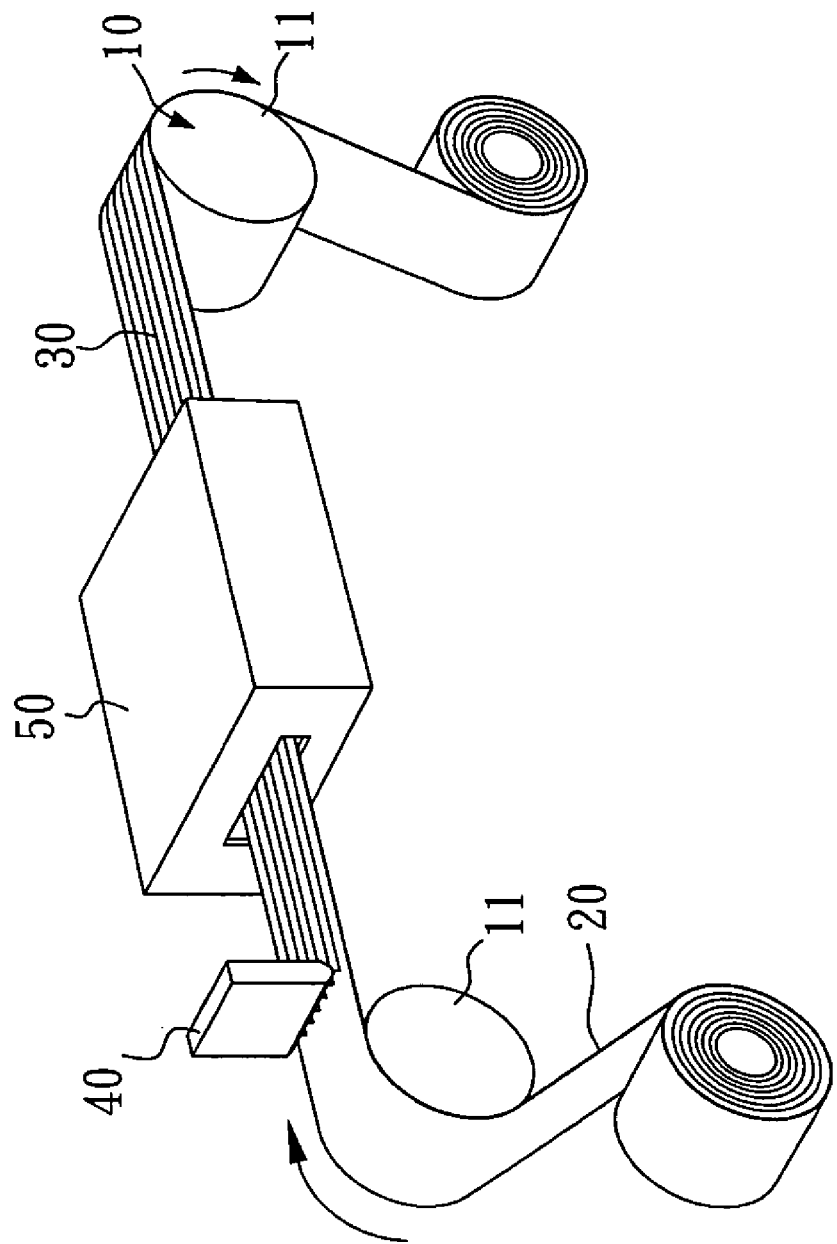
FIG. 1 is a schematic view of a bottom substrate of a preferred embodiment according to the present invention.

With reference to FIG. 1, a process for fabricating a bottom substrate of a passive matrix plastic display according to the preferred embodiment adopts a roll-to-roll machine 10 on which a first plastic substrate 20 is straightened by means of two rollers 11 mounted for transporting the first plastic substrate, the two rollers being positioned in front of the first plastic substrate 20 being rolled up and fist conducting lines 30 to be continuously formed parallel to one anther by means of a dispenser 40 respectively. The first conducting lines 30 are disposed parallel to the transportation direction of the first plastic substrate 20, and are made of an aluminum adhesive. Then, the first conducting lines 30 are hardened by means of a heat-drying (or hot-drying) machine 50. The first plastic substrate 20 is rolled up to complete the fabrication of the bottom substrate.

Figure 2:
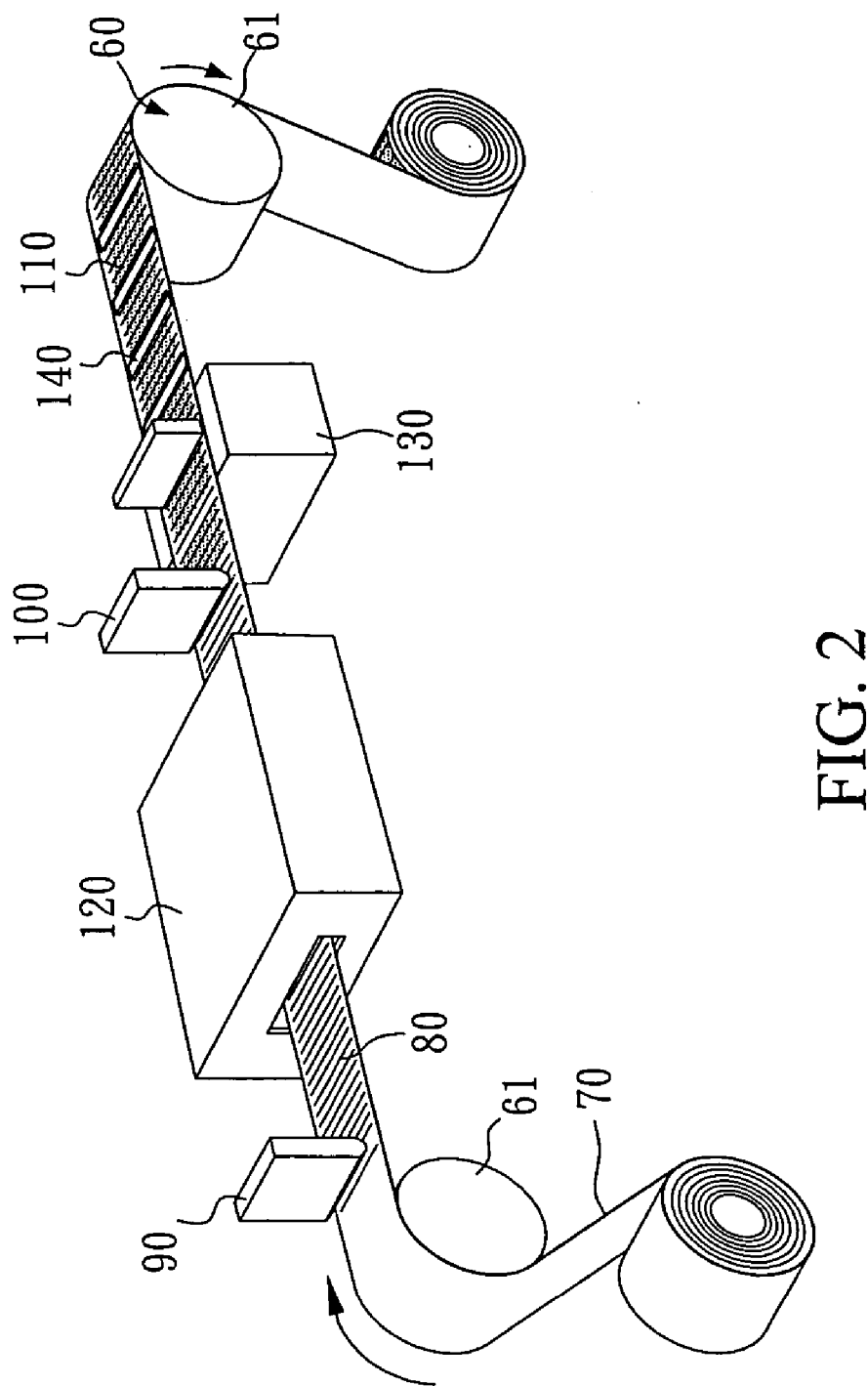
FIG. 2 is a schematic view of a top substrate of a preferred embodiment according to the present invention.

With reference to FIG. 2, a process for fabricating a top substrate of a passive matrix plastic display according to the preferred embodiment adopts a roll-to-roll machine 60 on which a second plastic substrate 70 is straightened by means of two rollers 61 mounted for transporting the second plastic substrate, the two rollers being positioned in front of the second plastic substrate 70 being rolled up and second conducting lines 80 to be formed parallel to one anther by means of a dispenser 90 respectively. The second conducting lines 80 are disposed perpendicular to the transportation direction of the second plastic substrate, and are made of a transparent conductive polymer. Then, the second conducting lines 80 are hardened by means of a hot-drying machine 120. A polymeric liquid crystal is coated over the second plastic substrate 70 by means of a slot-die 100 to form a plurality of block-shaped active areas 110. The portions of the second plastic substrate 70 outside the block-shaped active areas become hollow by means of a cutting machine 130 to form a hollow area 140. The second plastic substrate 70 is rolled up to complete the fabrication of the top substrate.

Figure 3:
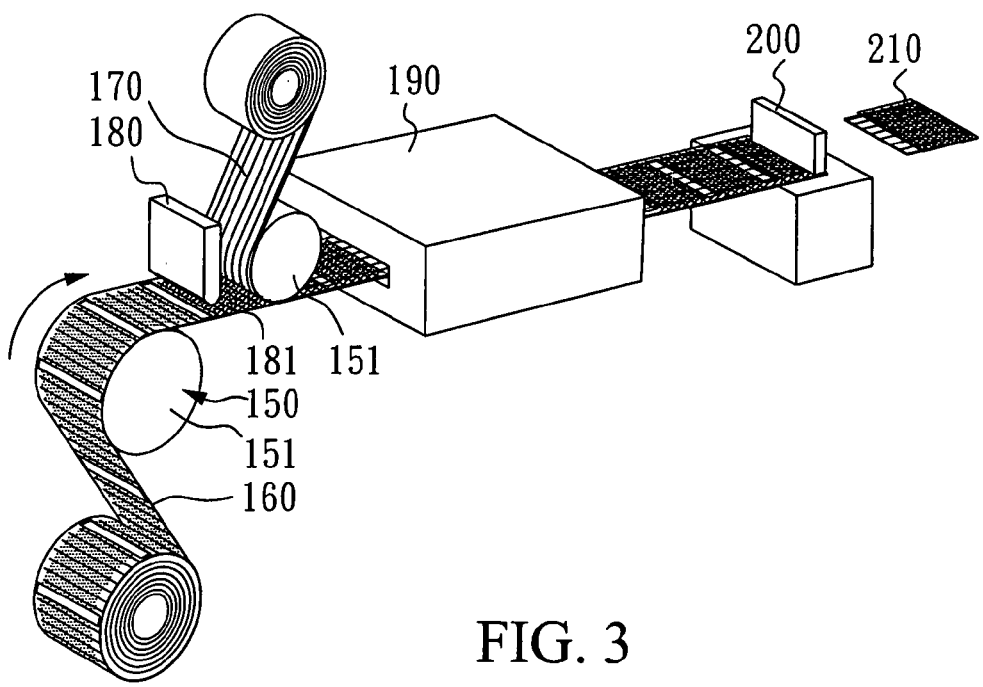
FIG. 3 is a schematic view of a sealed top and bottom substrates of a preferred embodiment according to the present invention.

With reference to FIG. 3, a process for sealing the top and bottom substrates of a passive matrix plastic display adopts a roll-to-roll coating machine 150 with two rollers 151 for driving the top substrate 160 and the bottom substrate 170 being aligned with the top substrate 160 on one side thereof. An adhesive 181 is coated over the top substrate 160 by means of a slot-die 180 to form an adhesion area. The top and bottom substrates 160, 170 are sealed. The adhesive 180 is hardened by means of a hot-drying machine 190. Finally, cutting machine 200 is employed to form a plurality of passive matrix plastic display panels 210.

In the preferred embodiment, the width of the first plastic substrate 20 is shorter than the width of the second plastic substrate 70 so that the second conducting lines 80 formed on the second plastic substrate 70 are exposed after the seal for being adapted to a driving circuit to be assembled. In the fabrication of the top substrate 160, each of the hollow portions formed with the cutting machine 130 is of rectangular shape, having a width (the length of the portion perpendicular to the transportation direction of the second plastic substrate 70) which is shorter than the width of the second plastic substrate 70 to prevent the second plastic substrate 70 from cracking during transportation and is longer than the width of every block-shaped active area 110 perpendicular to the transportation direction of the second plastic substrate 70 to expose the first conducting lines 30 after the top and the bottom substrates are sealed for being adapted to a driving circuit to be assembled.

In the preferred embodiment, the fabrication of a passive matrix plastic display is simply achieved by means of a roll-to-roll coating machine having a plurality of rollers, a cutting machine, a hot-drying machine and two coating dies. The fabrication cost is greatly reduced, as compared with the conventional process for fabricating the plastic displays which further requires a machine for depositing a metal film, an etching machine, a photolithographic machine and an apparatus for the liquid crystal filling. Furthermore, due to the continuous process the yield is increased. In addition, the coating of a polymeric liquid crystal saves the time for the liquid crystal filling and avoids deflection caused by the flow of the liquid crystal as being bent.

Although the present invention has been explained in relation to its preferred embodiment, it is to be understood that many other possible modifications and variations can be made without departing from the spirit and scope of the invention as hereinafter claimed.

What is claimed is:

1. A process for fabricating passive matrix plastic displays, comprising:
   (a) forming a plurality of second conducting lines over a second plastic substrate with a roll-to-roll coating machine, wherein said second conducting lines are disposed perpendicular to the transportation direction of said second plastic substrate;
   (b) continuously coating a polymeric liquid crystal over said second plastic substrate to form a plurality of block-shaped active areas;
   (c) hollowing or drilling the portions of said plastic substrate outside said block-shaped active areas formed on said second plastic substrate with a cutting machine;
   (d) providing a first plastic substrate having a plurality of first conducting lines disposed parallel to one another to have said first and said second plastic substrates mounted on a roll-to-roll coating machine simultaneously, wherein said first conducting lines of said first plastic substrate are disposed parallel to the transportation direction of said first plastic substrate; and
   (e) sealing said first and said second plastic substrates with an adhesive to form a plurality of passive matrix plastic display panels.

2. The method of claim 1, further comprising a post step (a1) curing or hardening said second conducting lines by means of an ultraviolet-radiation or a heat-drying machine after a plurality of second conducting lines are formed over a second plastic substrate with a roll-to-roll coating machine in step (a).

3. The method of claim 1, wherein said first or said second conducting lines are made of a transparent polymer.

4. The method of claim 1, wherein the width of said first plastic substrate is shorter than the width of said second plastic substrate to expose said second conducting lines for being externally connected to a driving circuit after said step (e) is completed.

5. The method of claim 1, wherein said second conducting lines in said step (a) are formed on the surface of said second plastic substrate by means of a dispenser or a die for screen printing, stamping or coating.

6. The method of claim 1, wherein said first conducting lines or said second conducting lines are made of a silver adhesive, a copper adhesive or an aluminum adhesive.

7. The method of claim 1, wherein said adhesive is coated over said first or said second plastic substrate in said step (e).

8. The method of claim 1, wherein said polymeric liquid crystal or said adhesive is formed by the slot-die coating in said steps (b) and (e).

9. The method of claim 1, further comprising a post step (e1) curing or hardening said adhesive by means of an ultraviolet-radiation or a heat-drying machine after sealing said first and said second plastic substrates with an adhesive in step (e).

10. The method of claim 1, further comprising a post step (f) drying said adhesive sealing said first plastic substrates and said second plastic substrates and separating said plurality of display panels by means of a cutting machine.

11. The method of claim 1, wherein each of said hollow portions formed by means of said cutting machine is of rectangular shape having a width in a direction perpendicular to the transportation direction of said second plastic substrate, said width of said rectangular hollow portions is shorter than the width of said second plastic substrate and is longer than the width of every said block-shaped active area perpendicular to the transportation direction of said second plastic substrate.

12. The method of claim 1, wherein an area being coated with said adhesive in said step (e) is larger than that of said block-shaped active area.

13. The method of claim 10, further comprising a post step (g) providing a driving circuit for connecting said first conducting lines to said second conducting lines after said plurality of display panels are separated in step (f).

14. The method of claim 1, wherein said first plastic substrate is mounted with said second plastic substrate and is aligned with said second plastic substrate on one side thereof so that said first conducting lines are perpendicular to said second conducting lines.

15. The method of claim 1, wherein said steps (a), (b) and (c) are processed by means of one roll-to-roll coating machine.

16. The method of claim 1, wherein said steps (a), (b), (c), (d) and (e) are processed by means of one roll-to-roll coating machine.

* * * * *